(12) United States Patent  
Conraux et al.

(10) Patent No.: US 7,472,834 B2  
(45) Date of Patent: Jan. 6, 2009

(54) DUAL-MODE SMART CARD

(75) Inventors: Jérôme Conraux, Trets (FR); Pierre Rizzo, Aix en Provence (FR)

(73) Assignee: STMicroelectronics S.A., Montrouge (FR)

( * ) Notice: Subject to any disclaimer, the term of this patent is extended or adjusted under 35 U.S.C. 154(b) by 506 days.

(21) Appl. No.: 10/886,934

(22) Filed: Jul. 8, 2004

(65) Prior Publication Data

US 2006/0086806 A1 Apr. 27, 2006

(30) Foreign Application Priority Data

Jul. 9, 2003 (FR) .................................. 03 50311

(51) Int. Cl.  
*G06K 19/06* (2006.01)

(52) U.S. Cl. ..................... 235/492; 235/449; 235/487

(58) Field of Classification Search ................ 235/440, 235/449, 450, 451, 487, 492  
See application file for complete search history.

(56) References Cited

U.S. PATENT DOCUMENTS

| 5,206,495 | A | 4/1993 | Kreft ........................... 235/492 |
| 6,168,083 | B1 | 1/2001 | Berger et al. ................. 235/492 |
| 6,565,007 | B1 | 5/2003 | Kreft ........................... 235/492 |
| 2002/0177407 | A1 | 11/2002 | Mitsumoto .................... 455/41 |
| 2003/0075601 | A1* | 4/2003 | Yagi et al. .................... 235/382 |
| 2005/0035200 | A1* | 2/2005 | Hendrick ..................... 235/441 |
| 2005/0178845 | A1* | 8/2005 | Desfontaines et al. ....... 235/492 |

FOREIGN PATENT DOCUMENTS

EP 1 179 806 A2 2/2002

\* cited by examiner

*Primary Examiner*—Karl Frech  
(74) *Attorney, Agent, or Firm*—Lisa K. Jorgenson; Robert Iannucci; Seed IP Law Group PLLC

(57) ABSTRACT

A dual-mode smart card comprising several pads of physical contact with an external reader and two pads of connection to an antenna for a contactless operation, and comprising a voltage regulator capable of extracting from a radio frequency excitation reaching the antenna, a supply voltage of the chip's processing circuits, this regulator being controllable by a central circuit to be deactivated in the presence of a supply voltage on contacts of the chip.

23 Claims, 2 Drawing Sheets

US 7,472,834 B2

DUAL-MODE SMART CARD

BACKGROUND OF THE INVENTION

1. Field of the Invention

The present invention relates to the field of so-called dual-mode chip-cards or smart cards, that is, cards which are likely to establish a communication with a read/write terminal via physical contacts as well as via an inductive coupling through an antenna.

2. Description of the Related Art

U.S. Pat. No. 6,168,083 depicts a dual-mode smart card, capable of operating either in a contact mode, or in a contactless mode. This patent provides selecting a communication session of contactless type if an A.C. voltage is induced in the antenna and a session of operation via physical contacts with a read/write terminal in the absence of such an A.C. voltage and if a D.C. voltage is present on the physical contacts provided for this purpose. The smart card is provided with two interfaces, respectively for the contactless mode and the contact mode, with a card memory, as well as with circuits for selecting one of the interfaces. In fact, the circuits of the smart card are activated as soon as a sufficient supply voltage level is detected by a level detection circuit, and the contactless interface is selected if another detector detects the present of an A.C. voltage across the antenna.

A disadvantage of the system provided by this document is that it does not allow switching from a contact operation to a contactless operation during a same operating session, that is, when the selection circuit has selected one of the interfaces. A system reset must then be awaited to, if desired, allow a switching by a new detection phase.

Another disadvantage of the system described by the above-mentioned document is that the linear regulator required for the contactless operation introduces a power dissipation even in the case of an operation with a power supply through physical contacts.

It would be desirable, in a dual-mode smart card, to allow switching from a contact operation to a contactless operation within a same communication session. Such a functionality is particularly advantageous in the case of smart cards coupled to portable devices provided with a battery. In such a case, the need to reset a communication session with the chip may impose an intervention of the user for a switching to a contactless operating mode. For example, in an application to mobile phones, an electronic chip of a smart card containing personal information of the user is by default in an operation with contacts with the rest of the mobile phone. This chip could be associated with a contactless operation, for example, to allow passing of automated public transport turnstiles by means of the same chip. Such an application cannot be envisaged with known systems, since this would force the user to cut a telephone communication to reset the smart card and then allow a selection to a contactless operating mode.

BRIEF SUMMARY OF THE INVENTION

One embodiment of the present invention provides a dual-mode smart card which overcomes the disadvantages of known solutions. More specifically, the embodiment provides a dual-mode smart card which is likely to switch from a contact operation to a contactless operation within a same communication session.

The embodiment also provides a solution which is compatible with the desired miniaturizations of smart cards.

The embodiment further provides a solution which is particularly simple to implement.

One embodiment of the present invention provides a dual-mode smart card comprising several pads of physical contact with an external reader and two pads of connection to an antenna for a contactless operation, and comprising a voltage regulator capable of extracting from a radio frequency excitation reaching the antenna a supply voltage of the chip's processing circuits, this regulator being controllable by a central circuit to be deactivated in the presence of a supply voltage on contacts of the chip, so that the chip can be powered by said contacts in a contactless operation.

According to an embodiment of the present invention, the central control circuit exploits the results of a detector of the presence of radio frequency signals on the antenna to select a contactless operating mode or a contact operating mode.

According to an embodiment of the present invention, in the presence of a radio frequency excitation and in the absence of a supply voltage through the physical contacts, a contactless operating session is started until complete reset of the system.

According to an embodiment of the present invention, in the absence of a radio frequency excitation voltage and in the presence of a contact supply voltage, the central control circuit deactivates the regulator and initiates a communication through the contact pads, the detector of the presence of radio frequency signals remaining activated to allow switching to a contactless operating mode upon arrival of a possible radio frequency excitation.

According to an embodiment of the present invention, the card further comprises means of direct asynchronous transmission between a demodulator of the signals received by the antenna and at least one input/output terminal with contacts.

The foregoing and other features, and advantages of the present invention will be discussed in detail in the following non-limiting description of specific embodiments in connection with the accompanying drawing which very schematically shows in the form of blocks an example of a dual-mode smart card according to the present invention.

DETAILED DESCRIPTION OF THE INVENTION

Figure 1:
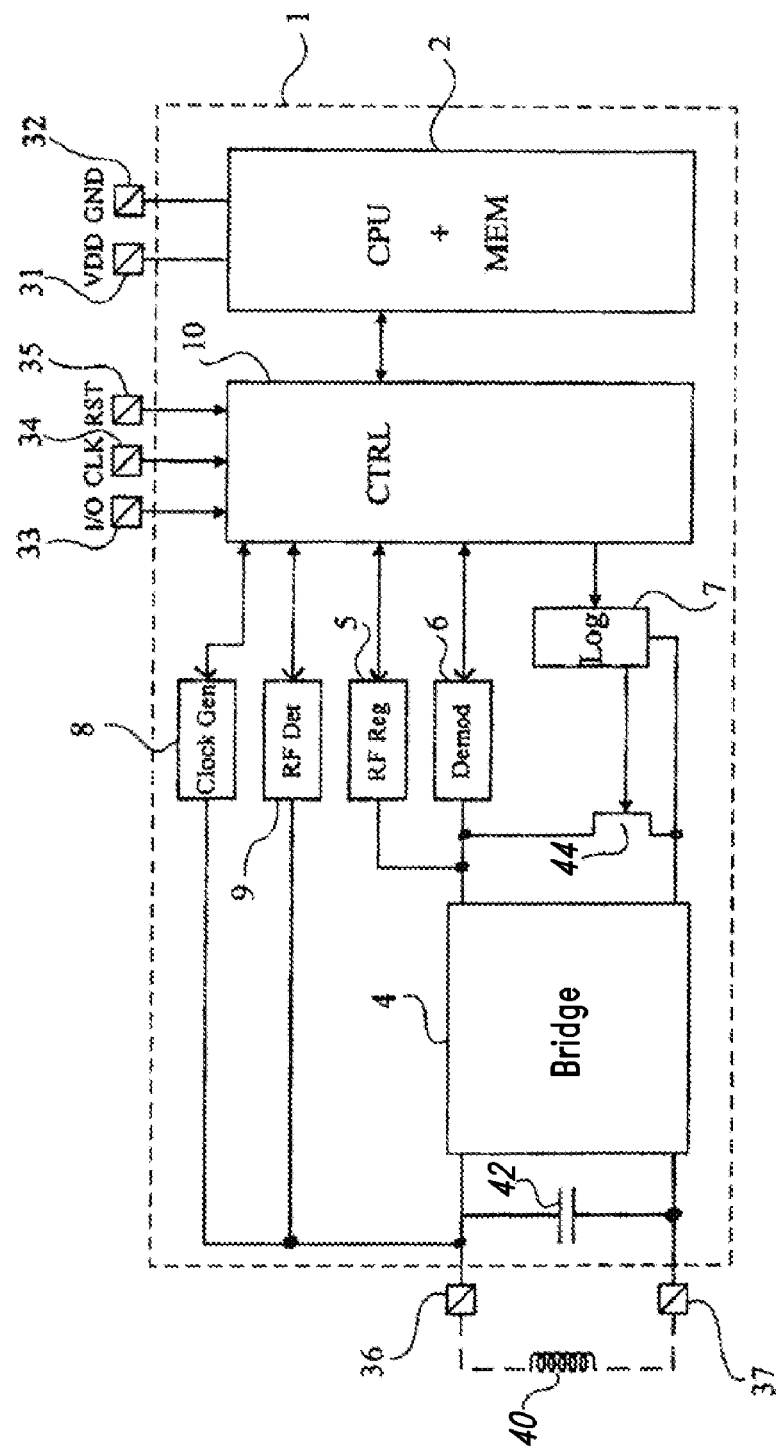
FIG. 1 is a schematic diagram of a smart card according to an embodiment of the present invention.

For clarity, only those elements necessary to the understanding of the present invention have been shown in the drawing and will be described hereafter. In particular, the operating details of the contact and contactless modes have not been detailed, the present invention applying to all the operating modes of contactless smart cards (electromagnetic transponders) and of contact smart cards.

Conventionally, a card 1 according to one embodiment of the present invention comprises a central processing unit as well as storage elements (block 2, CPU+MEM) corresponding to the conventional function of a smart card (FIG. 1).

Figure 2:
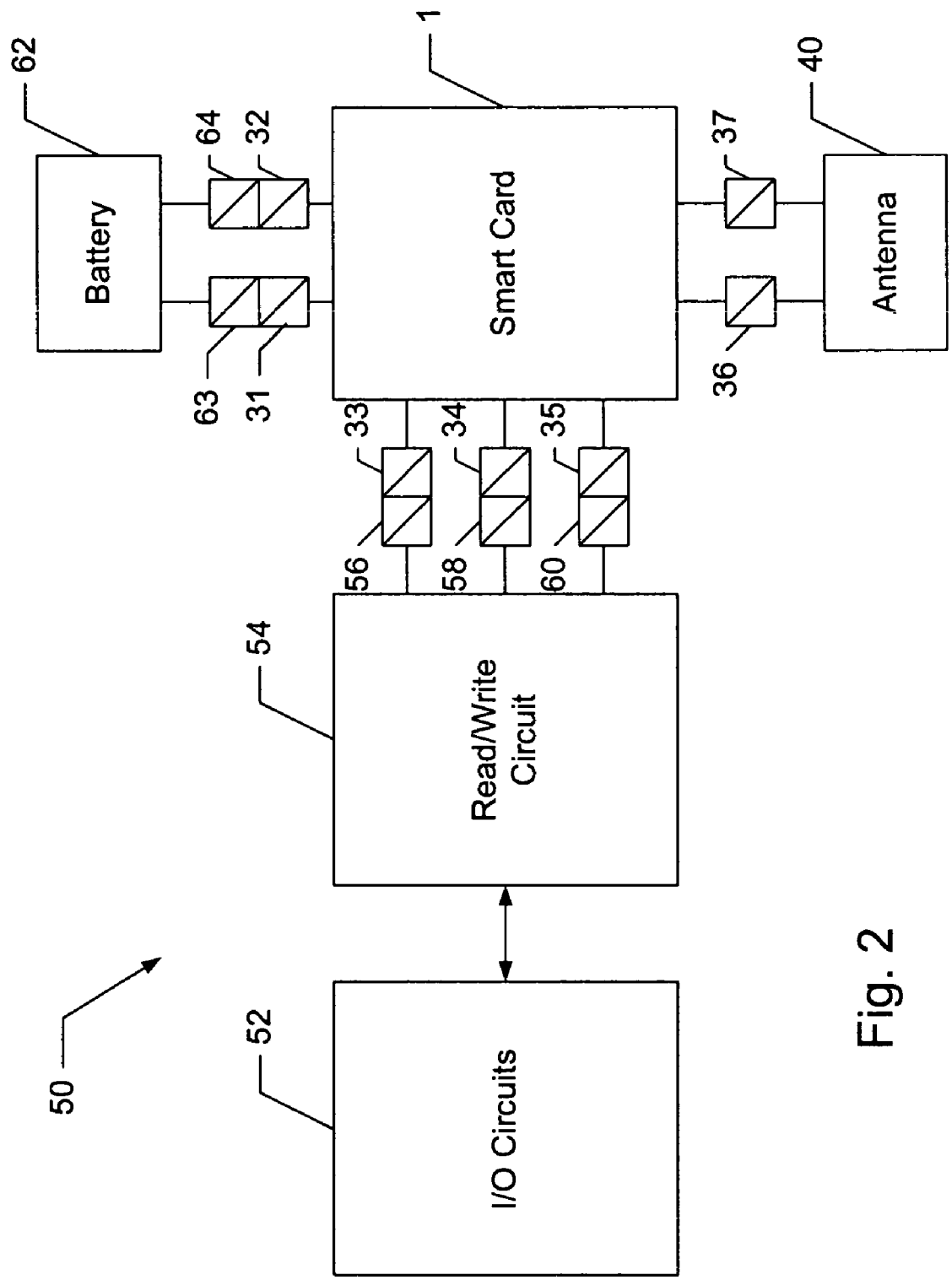
FIG. 2 is a schematic diagram of an electronic device with a smart card according to one embodiment of the present invention.

Block 2 is connected to two pads 31 and 32 of card 1 intended to receive a supply voltage Vdd when the card is engaged in an electronic device 50 with contacts (FIG. 2). Pad 31 is for example a positive power supply pad Vdd while pad 32 is a ground pad GND.

In the shown example, smart card 1 comprises three additional contacts 33, 34 and 35 respectively intended to perform functions of input/output (I/O), of supplying a clock signal CLK from the electronic device 50, and of supplying a reset signal RST from the electronic device.

It being a dual-mode smart card, said card also comprises two pads 36 and 37 intended to be connected across an antenna 40 in a contactless operation. A capacitor 42 connected to terminals 36 and 37 is generally integrated to card 1 and takes part with antenna 40 in the creation of a parallel resonant circuit likely to be excited by an electromagnetic field generated by a read/write station when card 1 draws close to the station. In this operation, smart card 1 respects the operations provided for electromagnetic transponders according to which a remote-supply carrier (for example, at 13.57 MHz) is modulated to transmit the data from the read/write station to the smart card 1 via the antenna 40, and according to which a transmission from the smart card to the station via the antenna is performed by back modulation at the rate of a sub-carrier (for example, at 847 kHz).

To enable demodulation of the data received in contactless mode as well as remote power supply of the card, a rectifying bridge 4 is generally connected by its two A.C. input terminals to pads 36 and 37. On the side of the rectified output of bridge 4, one of the terminals (for example, positive) is connected to the input of a regulator 5 (RF Reg), for example, linear, as well as to the input of a demodulator 6 (Demod). Regulator 5 is in charge of providing the rest of the card with the supply voltage necessary for its operation when it is remotely supplied by the electromagnetic field of the contactless station. Demodulator 6 is in charge of decoding the data transmitted by the station to the transponder.

For a data transmission from the card to the station, a back-modulation switch 44 switching a load between the two rectified output terminals of bridge 4 under control of a block 7 (Log) receiving the data to be transmitted is generally used. Finally, a contactless operation clock signal intended for the rest of the card is extracted by a clock generation block 8 (Clock Gen) having its input connected on one of pads 36 and 37.

According to one embodiment of the present invention, card 1 further comprises a circuit 9 (RF Det) for detecting the presence of a radio frequency excitation on antenna L to detect a need for switching to a contactless mode, as well as a general control circuit 10 (CTRL) in charge not only of the selection between the two operating modes, but also of the management of this operation.

The respective outputs of regulator 5, of demodulator 6, of clock generator 8, and of radio frequency detector 9 are sent to inputs of control circuit 10, and the latter is connected to pads 33, 34 and 35 of the contact operation. Further, circuit 10 provides the data signals for the back modulation block 7 and exchanges, with central unit circuit 2, data control signals and supply signals originating from terminals 31 and 32 in the contact operation mode. Circuit 10 exchanges signals with the different blocks of the card if this is required by their respective structures.

A feature of one embodiment of the present invention is to only use regulator 5 in contactless operation. As illustrated in the drawing, said regulator is connected upstream of the central unit circuit 2, control circuit 10, and supply terminals 31, 32 so that it only receives a signal to be regulated when a radio frequency voltage is present in contactless operation. The rest of the time, all the power supply is provided by the voltage present on terminals 31 and 32 and regulator 5 remains disconnected. In a simplified embodiment of regulator 5, it is enough for said regulator not to receive output signals from rectifying bridge 4, without it being necessary to provide a switching.

Circuit 10 manages the different signal exchanges as follows.

In the presence of a radio frequency excitation only of the smart card, that is, when no supply voltage arrives onto contacts 31 and 32, the card becomes supplied as an electromagnetic transponder by regulator 5 at the same time as a radio frequency excitation is detected by circuit 9 and as a clock is extracted from the A.C. excitation by block 8. Card 1 then operates in contactless mode by being self-supplied by the radio frequency field and the switchings are performed by the radio frequency channel only. In this operating mode, circuit 10 isolates contacts 33, 34, and 35 during the entire session.

In the presence of a sufficient supply voltage between terminals 31 and 32, this supply voltage is detected by circuit 10 which is supplied. If no radio frequency signal is detected by block 9, this means that there are contacts connected on card 1. A contact operation is then started and the communications are performed via pads 33 to 35. If they are provided with appropriate control signals, blocks 5, 6, 7 and 8 are set to stand-by while however making sure that radio frequency detector 9 remains in service.

In the absence of a radio frequency excitation detection by circuit 9, the operation is, conventionally, exclusively performed in a contact mode.

However, if during this session started in contact mode, detector 9 detects the presence of a radio frequency signal, block 10 which receives the information therefrom activates demodulator 6 to be able to exploit the signals received by the antenna. Regulator 5 however remains deactivated since the power is supplied by the contacts. As soon as demodulator 6 detects data, said data are transmitted by block 10 to central unit 2. The application software then selects, according to the requirements of the application program, whether to operate in a contact or contactless mode.

Taking the example of application to the passing of automated gates, the central unit may then process a small interruption to enable the gate passing without loosing the communication, for example on a telephone, established due to a contact session with the rest of the mobile phone.

Radio frequency signal detector 9 is, for example, a detector such as described in European patent application 0903688 of the applicant.

An advantage is that by providing a controllable regulator 5 upstream of control circuit 10, a switching from a contact operation to a contactless operation within a same session is allowed without risking a supply conflict between the two possible sources (contacts 31 and 32, antenna terminals 36 and 37). In the absence of such a controllable circuit, as is the case in particular in above-mentioned U.S. Pat. No. 6,168,083, it is not possible to switch from one mode to the other during a same session, as otherwise the radio frequency power supply risks to disappear because of the external power supply through pads, or conversely.

According to an alternative embodiment, a smart card according to the present invention may further be equipped with an asynchronous transmitter IART to transmit, without transiting through central unit 2, received data on the RF channel (demodulated by block 6), towards input/output pad(s) 33 in real time.

Of course, the present invention is likely to have various alterations, modifications, and improvements which will readily occur to those skilled in the art. In particular, the practical forming of central control circuit 10 is within the abilities of those skilled in the art based on the functional indications given hereabove. Further, although the present invention has been described in relation with five input/output pads for a contact operating mode, it may comprise a different number of contacts. Moreover, it should be noted that although a specific example has been described hereabove, the present invention applies to all types of operations and architectures of smart cards of electromagnetic transponder type and to all types of operations and architectures of smart cards with contacts.

Shown in FIG. 2 is a mobile telephone 50 according to one embodiment of the invention, which includes the smart card 1 of FIG. 1. The mobile telephone 50 includes I/O circuits 52 for communicating with a user of the mobile telephone and for communicating with other telephony devices, including telephones and modems. The mobile telephone 50 also includes a read/write circuit 54 for communicating with the smart card 1 via device I/O, clock, and reset terminals 56, 58, 60 that are in contact with the smart card I/O, clock, and reset terminals 33, 34, 35, respectively, during the contact operation mode. As mentioned above, the read/write circuit 54 reads from, and writes to, the memory of the smart card circuit 2, and can also communicate with the demodulator 6 to receive the data that was demodulated from the RF signals received by the antenna 40. Finally, the mobile telephone 50 also includes a battery 62 with respective supply terminals 64, 66 that respectively contact the smart card supply terminals 31, 32 during the contact operation mode.

It will be appreciated that conventional devices can be used for all of the structures of the mobile telephone 50, other than the smart card 1. Further, although FIG. 2 shows the inventive smart card 1 being employed in the mobile telephone 50, the smart card 1 can be employed in numerous other electronic devices without departing from the invention.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A dual-mode chip-card comprising:
   processing circuits;
   a control circuit for controlling the processing circuits;
   several pads for a physical contact with an external reader;
   two pads for connection to an antenna for a contactless operation; and
   a voltage regulator capable of extracting from a radio frequency excitation reaching the antenna a supply voltage for the processing circuits, said regulator being deactivated in the presence of a supply voltage on two of the several pads, so that the chip-card is powered by said two of the several pads in the contactless operation.

2. The chip-card of claim 1 wherein in the presence of a radio frequency excitation and in the absence of a supply voltage through the physical contacts, a contactless operating session is started until complete reset of the system.

3. The chip-card of claim 1, further comprising a radio frequency detector that detects radio frequency signals on the antenna and, in response, causes the control circuit to select a contactless operating mode.

4. The chip-card of claim 3 wherein, in the absence of a radio frequency excitation voltage and in the presence of a contact supply voltage, the control circuit deactivates the regulator and initiates a communication through the several contact pads, the radio frequency detector remaining activated to provide switching to a contactless operating mode upon arrival of a possible radio frequency excitation.

5. The chip-card of claim 3, further comprising means of direct asynchronous transmission between a demodulator of the signals received by the antenna and at least one of the several pads.

6. The chip-card of claim 3 wherein the control circuit is structured to keep the voltage regulator deactivated in response to receiving, while already in a contact operating mode, from the radio frequency detector a signal indicating that the detector detected radio frequency signals on the antenna.

7. The chip-card of claim 1 wherein the control circuit is structured to deactivate the regulator in response to detecting receipt of the supply voltage on the two of the several pads.

8. A dual-mode chip-card, comprising:
   a power source terminal structured for physical contact with an external electronic device with a power supply for supplying a contact supply voltage to the chip-card via the power source terminal when the power source terminal contacts the electronic device;
   an antenna terminal for connection to an antenna for a contactless operation in which RF signals are received by the antenna; and
   a voltage regulator coupled to the antenna terminal and decoupled from the power source terminal, the voltage regulator being structured to extract a contactless supply voltage from the RF signals reaching the antenna without regulating the contact supply voltage supplied to the power source terminal.

9. The chip-card of claim 8, further comprising:
   a control circuit structured to select either a contactless operating mode or a contact operating mode for the chip-card; and
   a radio frequency detector that detects the RF signals on the antenna and, in response, causes the control circuit to select the contactless operating mode.

10. The chip-card of claim 9 wherein, in the absence of the contactless supply voltage and in the presence of the contact supply voltage, the control circuit deactivates the regulator and causes a communication with the electronic device, the radio frequency detector remaining activated to provide switching to the contactless operating mode upon arrival of the RF signals.

11. The chip-card of claim 9 wherein the control circuit is structured to keep the voltage regulator deactivated in response to receiving, while already in a contact operating mode, from the radio frequency detector a signal indicating that the detector detected the RF signals on the antenna.

12. The chip-card of claim 8, further comprising:
   an RF detector that detects the RF signals on the antenna and, in response, outputs an RF detection signal;
   a demodulator that demodulates the RF signals;
   an I/O terminal structured to contact the electronic device to enable communication between the chip-card and the electronic device; and
   a control circuit structured to operate in a contact operating mode for the chip-card in response to determining that the contact supply voltage is received at the power source terminal and structured to temporarily couple the demodulator to the I/O terminal in response to receiving the RF detection signal from the RF detector.

13. The chip-card of claim 8, further comprising:
   a demodulator coupled to the antenna terminal and structured to demodulate the RF signals received by the antenna; and means of direct asynchronous transmission between the demodulator of the signals received by the antenna and an I/O terminal in contact with the electronic device.

14. The chip-card of claim 8, further comprising a control circuit structured to deactivate the regulator in response to detecting receipt of the contact supply voltage at the power supply terminal.

15. An electronic device, comprising:
a power supply terminal for outputting a contact supply voltage;
a device I/O terminal;
an antenna;
a chip-card that includes:
a power source terminal structured for physical contact with the power supply terminal to receive the contact supply voltage;
an antenna terminal for connection to the antenna for a contactless operation in which RF signals are received by the antenna;
memory that stores data for use by the electronic device;
a card I/O terminal coupled to the memory and structured for contact with the device I/O terminal; and
a voltage regulator coupled to the antenna terminal and decoupled from the power source terminal, the voltage regulator being structured to extract a contactless supply voltage from the RF signals reaching the antenna without regulating the contact supply voltage supplied to the power source terminal; and
a reader coupled to the device I/O terminal and structured to read the data from the chip-card memory via the I/O terminals.

16. The device of claim 15, wherein the chip-card further includes:
a control circuit structured to select either a contactless operating mode or a contact operating mode for the chip-card; and
a radio frequency detector that detects the RF signals on the antenna and, in response, causes the control circuit to select the contactless operating mode.

17. The device of claim 16 wherein, in the absence of the contactless supply voltage and in the presence of the contact supply voltage, the control circuit deactivates the regulator and causes a communication between the reader and the chip-card, the radio frequency detector remaining activated to provide switching to the contactless operating mode upon arrival of the RF signals.

18. The device of claim 16 wherein the control circuit is structured to keep the voltage regulator deactivated in response to receiving, while already in a contact operating mode, from the radio frequency detector a signal indicating that the detector detected the RF signals on the antenna.

19. The device of claim 15 wherein the chip-card further includes:
an RF detector that detects the RF signals on the antenna and, in response, outputs an RF detection signal;
a demodulator that demodulates the RF signals; and
a control circuit structured to operate in a contact operating mode for the chip-card in response to determining that the contact supply voltage is received at the power source terminal and structured to temporarily couple the demodulator to the card I/O terminal in response to receiving the RF detection signal from the RF detector.

20. The device of claim 15 wherein the chip-card further includes:
a demodulator coupled to the antenna terminal and structured to demodulate the RF signals received by the antenna; and
means of direct asynchronous transmission between the demodulator of the signals received by the antenna and the chip I/O terminal in contact with the electronic device.

21. The device of claim 15 wherein the reader is a read/write device that reads data from, and writes data to, the chip-card memory.

22. The device of claim 15, further comprising an I/O circuit coupled to the reader and structured to enable telecommunication between a user of the device and another device.

23. The device of claim 15 wherein the chip-card further includes a control circuit structured to deactivate the regulator in response to detecting receipt of the contact supply voltage at the power supply terminal.

* * * * *